United States Patent [19]
Sugita et al.

[11] 3,724,944
[45] Apr. 3, 1973

[54] LIGHT INTERCEPTING SCREEN WINDING AND PAYING-OUT DEVICE FOR COPYING MACHINES

[75] Inventors: Keiji Sugita; Hideaki Mochimaru; Toshio Watanabe, all of Ohta-ku, Tokyo, Japan

[73] Assignee: Kabushiki Kaisha Ricoh, Tokyo, Japan

[22] Filed: Oct. 1, 1971

[21] Appl. No.: 185,589

[52] U.S. Cl. ......................... 355/18, 355/8, 355/67, 95/15
[51] Int. Cl. ............................................. G03b 27/72
[58] Field of Search ............. 355/67, 70, 8, 18; 95/15

[56] References Cited

UNITED STATES PATENTS 3,533,691  10/1970  Suzuki..................................355/13

Primary Examiner—John M. Horan
Attorney—John J. McGlew et al.

[57] ABSTRACT

The device includes a movable optical system mounted for reciprocation between, and along a travel path parallel to, an original, to be duplicated, and a photosensitive sheet arranged in spaced parallel relation to each other to expose the sheet progressively to an optical image of the original. A pair of screen winding rollers are rotatably mounted in parallel relation to each other at respective ends of the travel path and extend transversely of the travel path, and a pair of light intercepting screens have first ends connected to respective ends of the optical system and second ends connected to respective rollers. An endless belt type of driving means is operatively connected to the optical system and to both rollers, and is operable to reciprocate the optical system while rotating one roller in the winding direction and the other roller in the paying-out direction. The driving means may be connected to the respective rollers through torsion springs allowing some angular displacement between each roller and the driving means to compensate for the thickness of screen wound on a roller.

6 Claims, 4 Drawing Figures

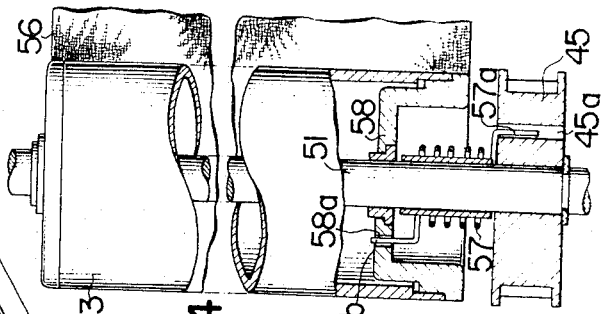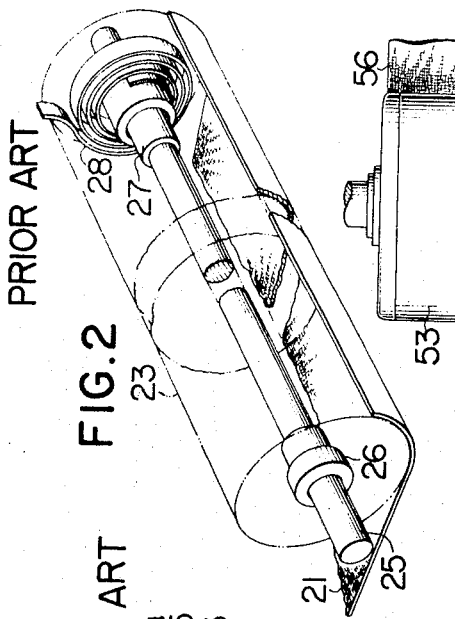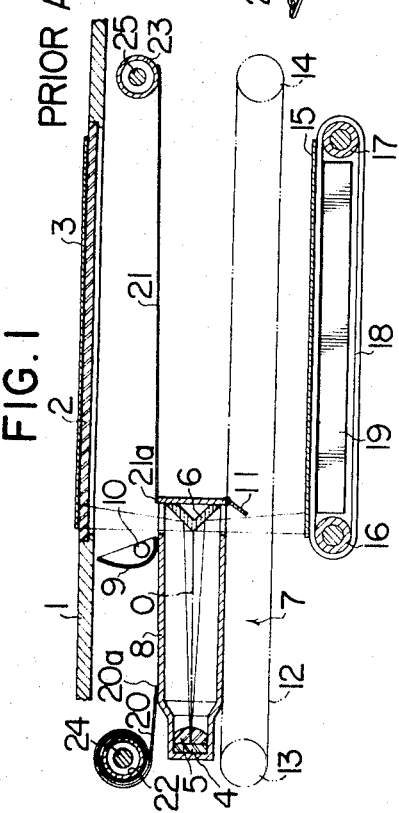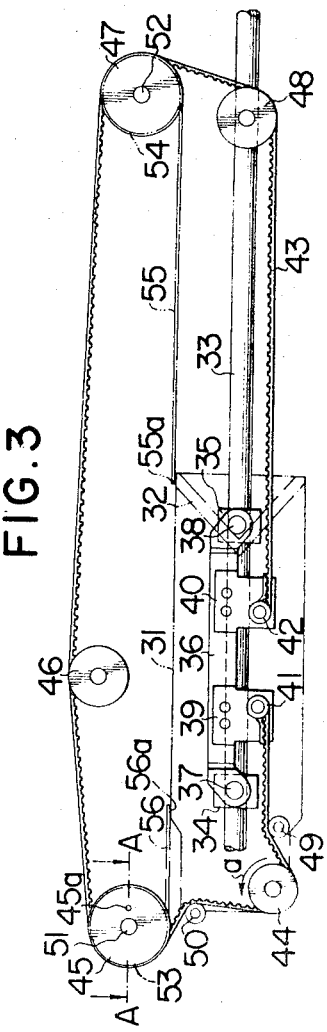

LIGHT INTERCEPTING SCREEN WINDING AND PAYING-OUT DEVICE FOR COPYING MACHINES

FIELD OF THE INVENTION

This invention relates to copying machines and, more particularly, to a winding and paying-out device for light intercepting screens of a copying machine.

BACKGROUND OF THE INVENTION

In a copying machine in which a movable optical system is interposed between an original, to be duplicated, and a photo-sensitive sheet, for exposing the copy sheet to an optical image of the original, and in which the movable optical system is reciprocated between and along a path parallel to the original and the copy sheet, two light intercepting screens are provided along the travel path of the optical system. Each screen is connected at one end to a respective end of the optical system and, at the other end, to support rollers rotatably mounted adjacent opposite ends of the travel path. These screens preclude exposure of the copy sheet to stray light from a light source for illuminating the original.

It has been customary to wind the light intercepting screens on the respective rollers and to pay the screens out from the respective rollers in conjunction with reciprocating motion of the movable optical system, in order to prevent loosening of the screens or to prevent the screens from interfering with the reciprocating movement of the optical system. A conventional device of this type is illustrated in FIGS. 1 and 2 of the accompanying drawing.

Referring to FIG. 1, an original 3, to be duplicated, is placed on a transparent rest table 2 supported by a support plate 1. To the left and downwardly from table 2, as shown in FIG. 1, there is an optical system 7 comprising a projection lens 5 formed integrally with a reflector 4 on its back surface, and a V-shaped reflector 6 disposed in a horizontal plane including the optical axis O of lens 5. The apex of reflector 6 is disposed in the horizontal plane of the optical axis O, and reflector 6 has two reflecting surfaces arranged to form the letter V and each disposed at 45° to the horizontal plane including optical axis O.

Optical system 7 is mounted in a support or housing 8, and a light source, in the form of the lamp 10 having a shade extending over its back surface, is mounted on the upper surface of housing 8 adjacent its right end. A movable throttle plate 11 is positioned at the right end of support or housing 8 adjacent its lower surface. As illustrated in chain lines in FIG. 1, a wire 12 is connected at its opposite ends to housing 8 and is trained around pulleys 13 and 14 mounted substantially below and adjacent opposite ends of rest table 2, in positions in which the pulleys do not interfere with the reciprocating movement of the optical system.

Housing 8 is supported, for reciprocation, by rails or other suitable support means, and is mounted for reciprocation in a plane substantially parallel to original rest table 2, from left to right, as viewed in FIG. 1, as pulleys 13 and 14 rotate. Housing 8 moves along original 3 for exposing a copy sheet 15 progressively to an optical image of original 3 during reciprocation of the optical system. Photosensitive sheet 15 is conveyed by a belt 18 trained about rollers 16 and 17, and is fixed temporarily in the position shown in the figure and which corresponds to the position of original 3, when belt 18 is stationary. Copy sheet 15 is drawn against belt 18 by the suction provided by means of the suction box 19 interposed between the upper and lower runs of belt 18 so that the copy sheet may be held in suitable planar shape.

Two light intercepting screens 20 and 21 are mounted above housing 8 along the path of reciprocating movement of the housing. Light intercepting screen 20 has one end connected to a tubular winding shaft or roller disposed substantially near one end of the travel path of the optical system, and connected at its other end 20a to the upper surface of housing 8 at the left end thereof. Light intercepting screen 21 has one end connected to a tubular winding shaft or roller 23 disposed substantially near the other end of the travel path of the optical system, and its other end 21a is connected to the upper surface of supporter 8 at the right end thereof. When optical system 27 is disposed in its starting position, as shown in FIG. 1, light intercepting screen 20 has been wound on shaft or roller 22, while light intercepting screen 21 has been paid out from shaft or roller 23 and is under tension. The tubular winding shafts or rollers 22 and 23 are rotatably mounted on fixed support shafts 24 and 25, respectively.

Referring to FIG. 2, bearings 26 and 27 are illustrated as provided on shaft 25 for rotatably supporting roller 23. A spiral spring 28 has its inner end secured to bearing 27, and its outer end is secured to roller 23. Spring 28 is capable of storing a resilient force of a magnitude sufficient to completely wind light intercepting screen 21 on its roller 23. Screen 21 is illustrated as paid out from roller 23 against the force of spiral spring 28, because optical system 7 is in its starting position, as shown in FIG. 1. Screen 21 is tensioned due to the stored resilient force of spring 20.

A similar spiral spring is connected between the other roller 22 and its support shaft. In the position of the parts shown in FIG. 1, screen 20 is completely wound on its roller 22 by virtue of the stored resilient force of the spiral spring.

Conventional light intercepting screens of this type have a disadvantage due to wear of the spiral springs, and they naturally have a relatively short service life. The two spiral springs in rollers 22 and 23 are wound and unwound to a great extent each time optical system 7 is reciprocated to expose copy sheet 15 to an optical image of original 3. While optical system 7 remains stationary, one of the spiral springs is in the unwound and tensioned state, while the other spiral spring is wound. The springs thus are placed under severe service conditions, with the result that they are liable to be prematurely worn so that they must be replaced by new springs.

SUMMARY OF THE INVENTION

The objective of the invention is to provide a device for winding and paying-out light intercepting screens which eliminates the spiral springs for rotating the rollers for the light intercepting screens. To this end, the device according to the invention includes a driving means which is operatively connected to the optical system and to both rollers, and is operable to reciprocate the optical system while rotating one roller in the screen winding direction and the other roller in the screen paying-out direction. The device further may include spring means connected between the driving means and each of the rollers, and allowing some angular displacement of a roller relative to the driving means to compensate for the thickness of the screen wound on a roller.

An object of the invention is to provide an improved light intercepting screen winding and paying-out device for copying machines.

Another object of the invention is to provide such a device which is effective to preclude excessive tensioning or slackening of the light intercepting screens when the screens are wound on or paid out from the respective rollers.

A further object of the invention is to provide such a device which has a greatly increased service life as compared with known devices of this type.

For an understanding of the principles of the invention, reference is made to the following description of a typical embodiment thereof as illustrated in the accompanying drawing.

BRIEF DESCRIPTION OF THE DRAWING

In the drawing:

FIG. 1 is a schematic sectional side view of the exposure portion of a copying machine provided with a prior art light intercepting screen winding and paying-out device;

FIG. 2 is a perspective view illustrating the spiral spring for rotating a screen winding roller, such as shown in FIG. 1;

FIG. 3 is a side elevation view of the light intercepting screen winding and paying-out device in accordance with one embodiment of the present invention; and FIG. 4 is a fragmentary sectional view taken along the line A—A of FIG. 3.

DESCRIPTION OF THE PREFERRED EMBODIMENT

In the following description, certain terminology is used, for convenience, solely by way of reference and not in a limiting sense. Thus, the terms "forward movement" and "rearward movement" will be used to designate directions in the figure to which reference is made, with the term "forward movement" meaning movement of the optical system to the right, as viewed in FIG. 3, and "rearward movement" will indicate movement of the optical system to the left as viewed in FIG. 3.

The optical system used in FIG. 3 is substantially identical with the optical system 7 of FIG. 1, and comprises a V-shaped reflector 32 and other components mounted in an optical system housing or supporter 31. The optical system of FIG. 3 is interposed between, and disposed in face-to-face relationship, with an original resting table and a photosensitive sheet, in the same manner as is the optical system 7 of FIG. 1.

Referring to FIG. 3, tubular members or sleeves 34 and 35 are fixed to housing 31 and fit loosely over a rod-shaped rail 33 on one side of housing 31. A similar arrangement, which has not been illustrated in the drawing, is provided at the opposite side of housing 31. Thus, housing 31 is slidably supported by sleeves, such as 34 and 35, on two substantially parallel rails.

A stay 36 is secured to tubular members 34 and 35 by respective pins 37 and 38, and has support plates 39 and 40 secured thereto. These support plates have respective belt connecting members 41 and 42 secured thereto, and annular portions on opposite ends of a belt 43 are connected to the belt hitch members 41 and 42. Belt 43, which is shown as a "geared" belt, is trained about a drive pulley or gear 44, a winding roller drive pulley or gear 45, an intermediate pulley or gear 46, a winding roller drive pulley or gear 47, and an intermediate pulley or gear 48. Tension rollers 49 and 50 press against the back or smooth surface of belt 43.

Drive pulleys or gears 45 and 47 are rotatably supported by respective fixed shafts 51 and 52, which also rotatably support screen winding roller 53 and screen winding roller 54, respectively. A front light intercepting screen 55 is connected at one end 55a to the upper right end portion of housing 31, and is connected at its other end to roller 54. A rear light intercepting screen 56 has one end 56a connected to the upper left end of housing 31, and the other end of screen 56 is connected to winding roller 53.

Referring to FIG. 4, a torsion spring 57 loosely embraces shaft 51 and interconnects pulley or gear 49 and winding roller 53. Thus, spring 57 has one end 57a engaged in an opening 45a in pulley or gear 45, and has its other end 57b engaged in an opening 58a in a bearing or hub 58 supporting winding roller 53. Pulley or gear 47 and its associated winding roller 54 are interconnected by a similar torsion spring, the torsion spring interconnecting pulley or gear 47 and shaft 54 being wound in a direction opposite to the winding direction of spring 57. The illustrated torsion springs may be replaced by coil springs or other suitable resilient means.

If driving pulley 44 rotates in the direction of arrow $a$ in FIG. 3, optical system supporter or housing 31 will move forwardly along the rails. When housing 31 reaches the limit of its forward movement, the direction of rotation of driving pulley 44 is reversed so that housing 31 is restored to its original or starting position. During this procedure, the original is scanned and the copy sheet is exposed to an optical image of the original, in the same manner as explained with reference to FIG. 1. Simultaneously with the reciprocation of support 31, winding rollers 53 and 54 are rotated in the same direction, through pulleys or gears 45 and 47, respectively, so that winding roller 53 pays out light intercepting screen 56 and roller 47 winds up screen 55, so that both light intercepting screens are moved smoothly. It should be understood that, if all play in the screens is to be eliminated, the driving pulleys or gears may be fixedly connected to the associated winding rollers without the interposition of connecting springs, such as shown in FIG. 4.

If a torsion spring or a spiral spring is interposed between each drive pulley or gear and the associated winding roller, this spring will absorb, by being torsioned, the difference between the angular velocity of the drive pulley and the screen winding rate of the associated roller, which may vary depending on the thickness of the screen wound thereon. As a result, the screens can move smoothly in a properly tensioned state without being loosened or tensioned excessively.

If the diameter of the drive pulleys or gears and the average thickness of the associated winding rollers when the respective screens are wound thereon are set beforehand at approximate values, the torsion spring or spiral spring interconnecting each drive pulley or gear to its associated roller will be torsioned only a very small amount, thereby making it possible to prolong the service life of such a spring.

In an illustrated embodiment, the drive mechanism comprises a geared or toothed belt and drive gears. It should be understood that this driving mechanism may be replaced by a power transmission mechanism comprising a wire and pulleys, or by a chain trained over sprocket wheels. Furthermore, double coated adhesive tapes or rivets may be used for securing the two light intercepting screens to the optical system supporter or housing.

While a specific embodiment of the invention has been shown and described in detail to illustrate the application of the principles of the invention, it will be understood that the invention may be embodied otherwise without departing from such principles.

What is claimed is:

1. A light intercepting screen winding and paying-out device for copying machines comprising, in combination, a movable optical system mounted for reciprocation between, and along a travel path parallel to, an original, to be duplicated, and a photosensitive sheet, arranged in spaced parallel relation to each other, to expose the photosensitive sheet progressively to an optical image of the original; a pair of screen winding rollers, freely rotatable in both directions, rotatably mounted in parallel relation to each other at respective ends of said travel path and extending transversely of said travel path; a pair of light intercepting screens each connected, at one end, to a respective end of said optical system and, at the other end, to a respective roller; driving means, including an element directly connected to said optical system and coupled to both of said roller independently of said optical system, operable to reciprocate said optical system while rotating one roller in the screen winding direction and the other roller in the screen paying-out direction.

2. A light intercepting screen winding and paying-out device for copying machines, as claimed in claim 1, including a respective fixed shaft rotatably supporting each winding roller; said driving means including a respective drive member rotatably mounted on each fixed shaft; and respective means connecting each drive member to its associated winding roller.

3. A light intercepting screen winding and paying-out device for copying machines, as claimed in claim 2, in which each connecting means provides limited relative angular displacement between the associated drive member and the associated winding roller.

4. A light intercepting screen winding and paying-out device for copying machines comprising, in combination, a movable optical system mounted for reciprocation between, and along a travel path parallel to, an original, to be duplicated, and a photosensitive sheet, arranged in spaced parallel relation to each other, to expose the photosensitive sheet progressively to an optical image of the original; a pair of screen winding rollers rotatably mounted in parallel relation to each other at respective ends of said travel path and extending transversely of said travel path; a pair of light intercepting screens each connected, at one end, to a respective end of said optical system and, at the other end, to a respective roller; driving means operatively connected to said optical system and to both of said rollers operable to reciprocate said optical system while rotating one roller in the screen winding direction and the other roller in the screen paying-out direction; a respective fixed shaft rotatably supporting each winding roller; said driving means including a respective drive member rotatably mounted on each fixed shaft; and respective means connecting each drive member to its associated winding roller; each connecting means providing limited relative angular displacement between the associated drive member and the associated winding roller; and comprising a torsion spring embracing the associated fixed shaft and having one end secured to the associated drive member and its opposite end secured to the associated winding roller; said torsion springs compensating for differing thicknesses of screen wound on the associated rollers.

5. A light intercepting screen winding and paying-out device for copying machines comprising, in combination, a movable optical system mounted for reciprocation between, and along a travel path parallel to, an original, to be duplicated, and a photosensitive sheet, arranged in spaced parallel relation to each other, to expose the photosensitive sheet progressively to an optical image of the original; a pair of screen winding rollers rotatably mounted in parallel relation to each other at respective ends of said travel path and extending transversely of said travel path; a pair of light intercepting screens each connected, at one end, to a respective end of said optical system and, at the other end, to a respective roller; driving means operatively connected to said optical system and to both of said rollers operable to reciprocate said optical system while rotating one roller in the screen winding direction and the other roller in the screen paying-out direction; a respective fixed shaft rotatably supporting each winding roller; said driving means including a respective drive member rotatably mounted on each fixed shaft; and respective means connecting each drive member to its associated winding roller; said drive members being rotatable pulleys; said driving means including an endless belt trained over said pulleys and having its opposite ends connected to said movable optical system; and a driving pulley operatively engaged with said endless belt to drive the latter to rotate said pulleys and the associated winding rollers conjointly.

6. A light intercepting screen winding and paying-out device for copying machines, as claimed in claim 5, in which said belt is a toothed belt having gear teeth on one surface; said pulleys comprising gear pulleys having gear teeth on their periphery engaged with the teeth of said toothed belt.

* * * * *